No. 714,976. Patented Dec. 2, 1902.
I. F. TUCKER.
POTATO DIGGER.
(Application filed Dec. 5, 1901.)
(No Model.)
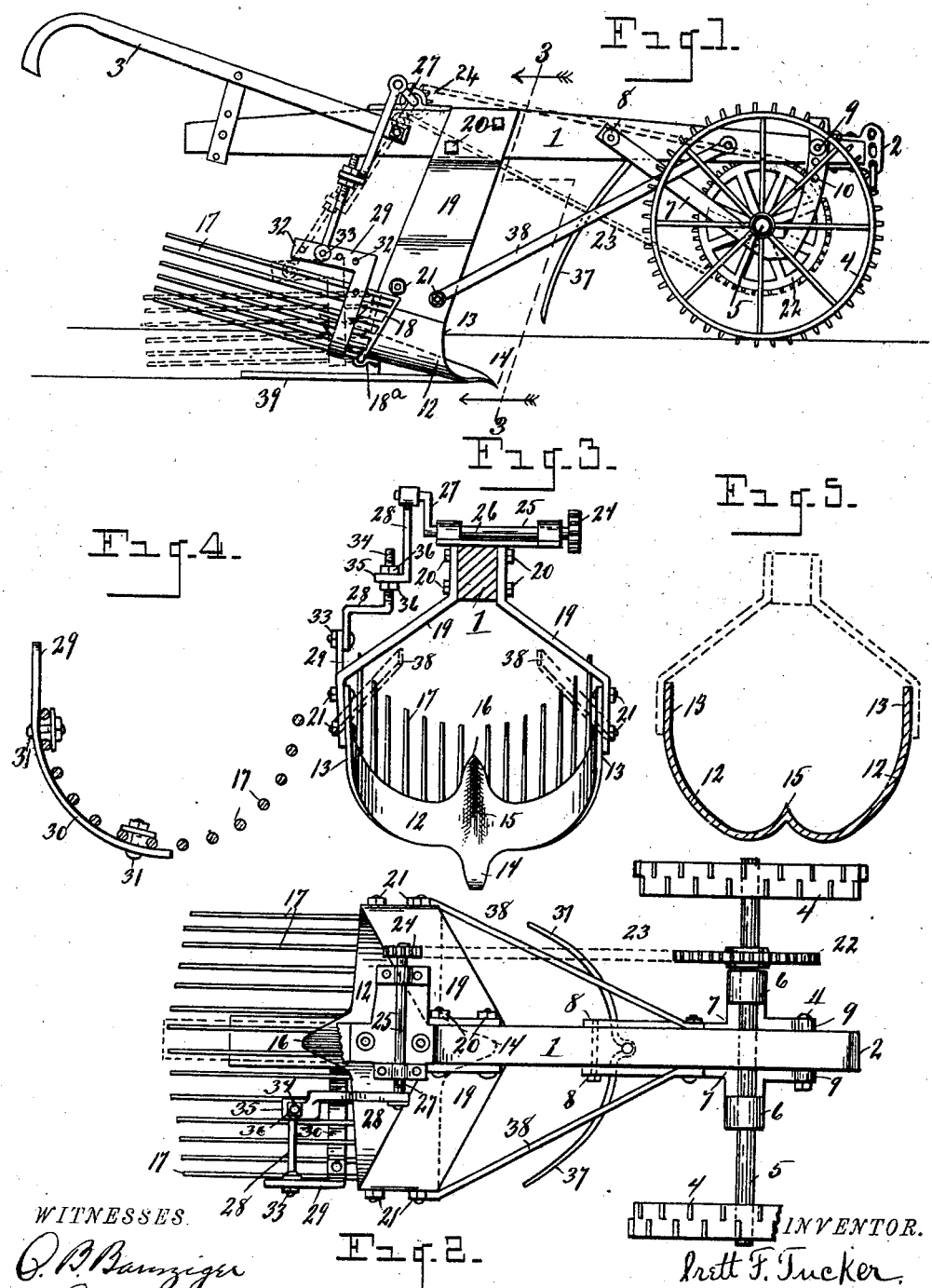

UNITED STATES PATENT OFFICE.

IRETT F. TUCKER, OF SUMNER, MICHIGAN, ASSIGNOR OF ONE-HALF TO ARTHUR E. FOWLER, OF SUMNER, MICHIGAN.

POTATO-DIGGER.

SPECIFICATION forming part of Letters Patent No. 714,976, dated December 2, 1902.

Application filed December 5, 1901. Serial No. 84,747. (No model.)

*To all whom it may concern:*

Be it known that I, IRETT F. TUCKER, a citizen of the United States, residing at Sumner, in the county of Gratiot, State of Michigan, have invented certain new and useful Improvements in Potato-Diggers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to a potato-digger; and it consists in the construction and arrangement of parts hereinafter fully set forth, and pointed out particularly in the claims.

The object of the invention is to produce an efficient machine of comparatively light draft in which the arrangement is such as to perfectly dig a single row of potatoes, to separate the potatoes from the dirt by breaking up the soil as it passes through the semicircular shovel and pulverizing it by the tilting of the screen which receives the soil and potatoes at the rear of the shovel and which separates the dirt from the potatoes and deposits the potatoes in a narrow row at the rear of the machine.

The above object is attained by the mechanism illustrated in the accompanying drawings, in which—

Figure 1 is a side elevation of a machine involving my invention. Fig. 2 is a plan view, parts being broken away. Fig. 3 is a vertical section through the beam and braces, as on line 3 3 of Fig. 1. Fig. 4 is a transverse section through the tines of the sieve, showing the semicircular form of said sieve. Fig. 5 is a transverse section through the shovel-blade, showing the semicircular formation of said shovel and the central ridge extending longitudinally thereof.

Referring to the characters of reference, 1 designates the beam of the machine, to the forward end of which is secured a clevis 2 or other suitable means of attachment of a whiffletree for the purpose of drawing the machine when in operation. At the rear of the beam are the handles 3, by means of which the machine is guided.

The forward end of the machine is supported on the transporting-wheels 4, journaled upon an axle 5, which is in turn journaled in suitable boxes 6, supported by the hangers 7, which are pivoted at 8 to the opposite sides of the beam and have at their forward ends the curved vertically-extending portions 9, which pass on opposite sides of the beam and are provided with a series of apertures 10, adapted to receive a bolt 11, which passes through said apertures and through the beam and through the medium of which said hangers may be adjusted vertically to raise and lower the forward end of the beam, and thereby regulate the depth at which the shovel enters the ground. The shovel-blade 12 in general form is semicircular, although the extremities 13 of the opposed sides thereof extend vertically.

Projecting from the forward edge of the shovel is a tapered downwardly-extending point 14, adapted to direct the shovel into the ground, and leading rearwardly from said point is a central ridge 15, parallel with the longitudinal axis of the shovel and terminating in a rearwardly-projecting point 16, which rises above the plane of the point 14 and overhangs the semicircular sieve 17, which is composed of a series of parallel steel bars united at their forward ends by a circular bar 18, (see Fig. 1,) shaped to describe the arc of a circle and hinged at 18$^a$ to the under face of the shovel at the rear.

The shovel 12 is supported by the hangers 19, whose upper ends are secured by the bolts 20 to the opposite faces of the beam and whose body portions extend outwardly and downwardly to the sides of the shovel-blade, where a bend is formed in said hangers to enable their ends to embrace the outer face of the shovel sides, to which they are secured by the bolts 21. By this arrangement of hanging and supporting the shovel the central opening therethrough is unobstructed, allowing a free passage-way through the semicircular shovel for the potato-vines and earth and offering little resistance in the ground to the movement of the machine.

In order to separate the potatoes from the soil and present them in a narrow row upon the surface of the ground in the rear of the machine, it is essential that the screen 17 shall have a vibratory movement. To impart said movement to the screen, a sprocket-wheel 22 is mounted upon the axle 5, and leading from said sprocket-wheel is a chain-belt 23, which passes around a sprocket-pinion 24, upon a counter-shaft 25, journaled in a plate 26, mounted upon the upper face of the beam. Upon the end of said shaft is a crank 27, to the upper end of which is journaled a pitman 28, pivotally attached at its lower end to an angle-bar 29, having a curved downwardly-extending portion 30, which conforms to the contour of the semicircular screen and is secured to the bars thereof by the bolts 31. In the horizontal portion of the angle-bar 29 are a series of holes 32, through which the bolt 33, which pivots the lower end of the pitman to said bar, may be passed in changing the point of pivot of said pitman, and thereby increasing or decreasing the throw of the screen as it is made to oscillate upon its hinge or pivot 18$^a$. The pitman 28, as will be seen, is made in two sections, one section having the threaded portion 34 and the other the projecting ear 35, through which said threaded portion passes and in which said threaded portion is adapted to be secured by the nuts 36, which embrace said threaded portion upon opposite sides of said ear. By this arrangement the pitman may be increased or decreased in length, so as to regulate the height of the screen when in its normal position.

Secured to the under side of the beam and curving outwardly and downwardly are the rake-tines 37, which stand on opposite sides of the shovel-blade in advance thereof and serve to rake the potato-vines which have fallen over the sides of the row, so as to carry them forward and inward in such position as to pass through the shovel as it is drawn through the ground in the operation of digging potatoes and obviating the clogging of the shovel by the accumulation of the vines across its forward edge.

To brace the hangers, which carry the digging-shovel, the diagonal brace-rods 38 are employed. The forward ends of said rods are bolted to the opposite sides of the beam, and the rear diverging ends of said rods are bolted to the lower ends of said hangers.

Extending rearwardly from the forward point of the shovel is a flat bearing plate or shoe 39, which bears upon the ground at the bottom of the cut and supports the shovel as it is drawn through the soil.

In the operation of this device the parts are so adjusted as to cause the point of the plow to enter the ground at sufficient depth to pass under the potatoes in the row, so that when the plow is drawn through the ground the earth and potatoes are lifted and pass through the shovel, wherein the dirt is broken up by the central ridge 15 and the rearwardly-extending point 16, which overhangs the sieve. In falling over the point 16 the earth is further pulverized, so that when it reaches the screen it is in condition to pass freely through the tines thereof. The movement imparted to the tines of the sieve by the mechanism previously described readily separates the potatoes from the earth and discharges the former from the rear end of the sieve in a narrow row, leaving the potatoes upon the surface of the ground, where they can be easily gathered. It will be seen that as the soil and potatoes pass through the semicircular shovel they are not allowed to fall over the edges of the sieve, because of the extending sides thereof, which confine the potatoes within the sieve and cause them to be discharged only at the rear end, thereby preventing a scattering of the potatoes over the surface of the ground. It will also be observed that the shovel or plow is comparatively narrow, so that no great weight of dirt is carried thereby at any time, and that said shovel is of such shape as to quickly break up any solid formations, thereby allowing the dirt to pass quickly through the agitated sieve, the result of which operation is to merely raise the dirt, separate the potatoes therefrom, and allow the dirt to fall back nearly in the same place from which it was taken. The circle of the shovel is such as to reach across the row, and thereby take in all of the potatoes that may be growing at the sides. The large unobstructed opening through the shovel and between the hangers which support the shovel prevents any possible clogging of the machine and allows the earth, vines, and potatoes to pass freely therethrough.

Having thus fully set forth my invention, what I claim as new, and desire to secure by Letters Patent, is—

1. In a potato-digger, the combination of the beam and transporting-wheels mounted at the forward end thereof, the hangers extending obliquely downward from opposite sides of said beam and securely bolted thereto, the semicircular shovel secured rigidly to said hangers, the semicircular sieve hinged at its lower edge to the rear of said shovel and embracing the same and means for imparting movement to said sieve.

2. In a potato-digger, the combination of the frame and transporting-wheels, of a semicircular shovel-blade supported at the sides to allow an unobstructed opening therethrough, a semicircular sieve hinged at its lower edge to the rear edge of the shovel and embracing the same, said shovel having a raised central rib extending longitudinally thereof and a bearing-shoe extending rearwardly from its under face.

3. In a potato-digger, the combination of the beam and transporting-wheels, the semicircular shovel, hangers supporting said shovel from said beam, a semicircular sieve hinged at its lower edge to the rear edge of said shovel and embracing said shovel, a crank-shaft and means for imparting movement thereto, a pitman connecting said crank-shaft to said sieve, said pitman having an extensible joint therein to enable it to be adjusted longitudinally.

In testimony whereof I sign this specification in the presence of two witnesses.

IRETT F. TUCKER.

Witnesses:
    E. S. WHEELER,
    E. C. DAVIS.